H. H. Evarts,
Making Staves,
N° 19,692.
Patented Mar. 23, 1858.
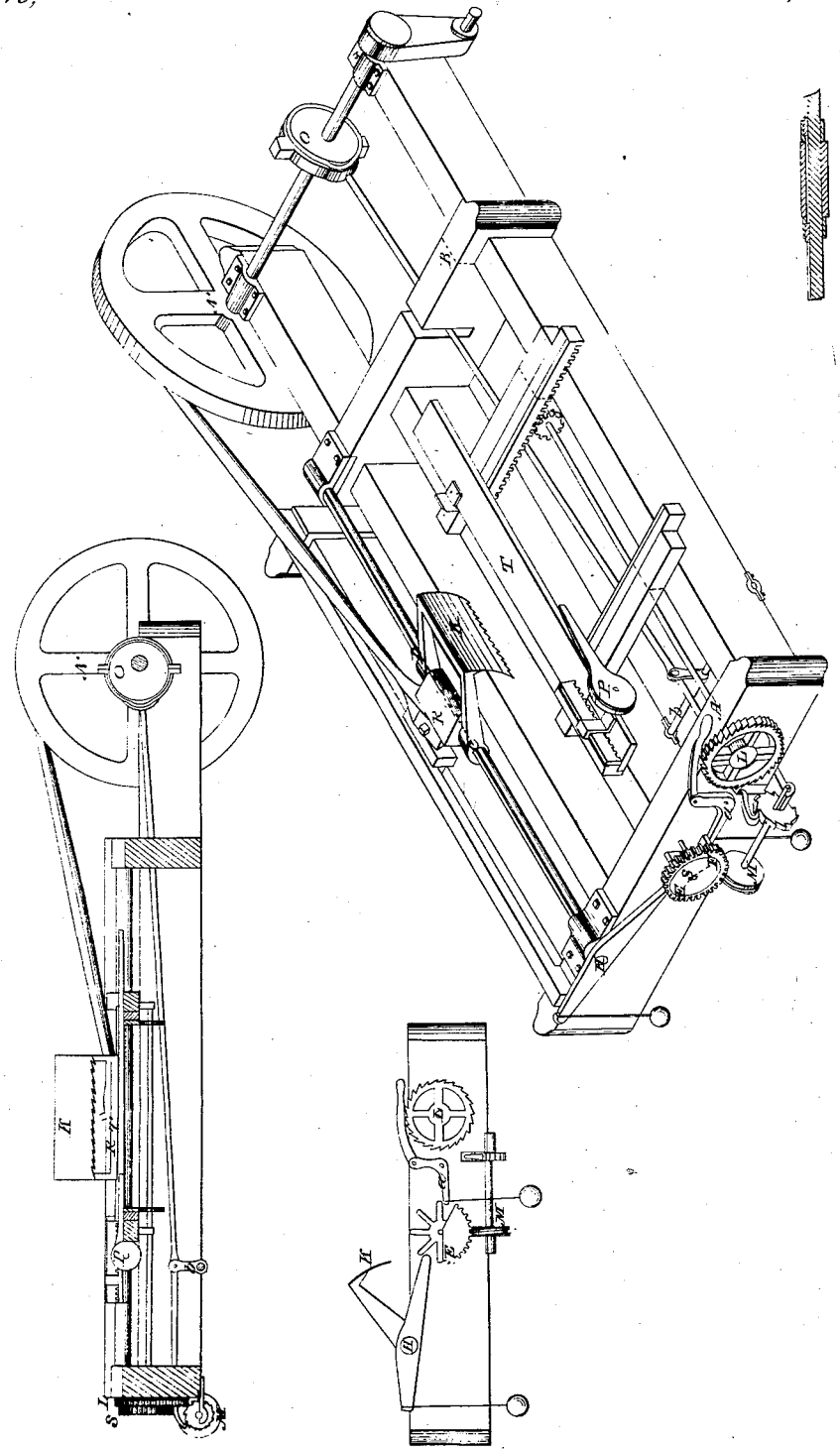

UNITED STATES PATENT OFFICE.

HARRY H. EVARTS, OF CHICAGO, ILLINOIS.

MACHINE FOR SAWING STAVES.

Specification of Letters Patent No. 19,692, dated March 23, 1858.

*To all whom it may concern:*

Be it known that I, HARRY H. EVARTS, of Chicago, in the county of Cook and State of Illinois, have invented a new and useful Machine for Sawing Staves; and I do hereby declare that the following is a full, clear, and exact description of the construction and operation of the same, reference being had to the accompanying drawings, making a part of this specification, in which—

Figure 1 is a perspective view, Fig. 2 a longitudinal elevation and Fig. 3 a transverse section.

The nature of my invention consists in so forming and arranging the saw and machinery as to enable me to saw the stave in the direction of the fiber of the wood so that the saw cuts or planes the stave from the block much as it would be done by a joiner's plow yet so smoothly that the stave will need no further dressing.

To enable others skilled in the art to make and use my invention I will proceed to describe its construction and operation.

The saw for my barrel stave mill is two feet in length nine inches in breadth and $\frac{1}{8}$ inch in thickness. This saw is straight lengthwise but transversely segmental making part of a circle of twenty-six inches diameter. Upon the lower straight edge of the saw are teeth as seen at K Figs. 1 and 2. This saw K is bolted on to a saw gate having two arms which clasp the grooved shaft H at C, D. Fast to their arms at C, D, are two keys or feathers, fitted into the groove of the shaft so as to slide therein, as shown in Fig. 4. By this arrangement it will be seen that when the shaft performs any part of a revolution the saw gate and consequently the saw must revolve or move with it. As the saw is a segment of a circle of twenty-six inches in diameter it must be placed thirteen inches from the center of the shaft.

Upon the end of the shaft at H is a weighted lever made fast to the shaft. This weight turns the shaft so as to move the saw up above the block to be sawed. At the end of the lever opposite the weight will be seen a star wheel in Fig. 3 made fast to the worm wheel E. When the machine is operating the star wheel is made to bear down the lever so as to bring the saw in contact with the block feeding slowly and regularly so as to give the saw the proper amount of cutting at each stroke until the stave is cut off when the arm of the star wheel passes the lever and allows the weight at the opposite end to fall and throw up the saw until the end of the lever comes in contact with another arm of the star wheel which immediately produces another downward movement of the saw. When the saw is up the star wheel lets go the weighted bent lever "a" allowing the weight to move down the lever drawing forward the ratchet wheel L and through the medium of shaft pinions and racks set forward the carriage T to which the block is fastened so that the saw in its repeated downward movement will cut from the block another stave.

While the mill is working the star wheel is moved in the one direction at each revolution of the driving shaft by means of cam O rod, rock shaft hand ratchet short shaft worm M and worm wheel E to which the star wheel is made fast all of which are shown in the perspective and in Figs. 2 and 3 and as each arm of the star wheel passes off from the weighted levers the saw is thrown up and the block moved forward by the weights.

Between the arms of the saw gate is fitted a tube clasping the shaft but without a feather to run on the groove so that the shaft turns freely within it. This tube is part of a cross head, having a wrist projecting horizontally from its side to a plate three inches from the tube making nearly the letter H, which plate works between two slides and keeps the wrist in a horizontal position. Attached to the wrist in the usual manner is a connecting rod leading to and connecting it with the crank pin on the fly wheel upon the driving shaft.

It will be readily seen that when the main shaft is made to revolve it will communicate to the saw a reciprocating motion and that through the cam O all the feeding machinery is made to perform its appropriate work.

What I claim and desire to secure by Letters Patent is—

The arrangement of the machinery as described and shown in the specification and for the purposes therein set forth.

HARRY H. EVARTS.

Witnesses:
G. LYMAN,
ROBINSON BARTON